(12) United States Patent
Lyons et al.

(10) Patent No.: US 7,166,148 B2
(45) Date of Patent: Jan. 23, 2007

(54) GAS SEPARATION MEMBRANES

(75) Inventors: Arthur Lyons, Gloucestershire (GB); Andrew Van Den Gross, Kent (GB)

(73) Assignee: Smart Membrane Corp., Nassau (BS)

( * ) Notice: Subject to any disclaimer, the term of this patent is extended or adjusted under 35 U.S.C. 154(b) by 113 days.

(21) Appl. No.: 10/636,294

(22) Filed: Aug. 7, 2003

(65) Prior Publication Data

US 2004/0149127 A1    Aug. 5, 2004

(30) Foreign Application Priority Data

Jan. 17, 2003    (GB) ................. 0301139.2

(51) Int. Cl.
*B01D 53/22* (2006.01)
*B01D 71/68* (2006.01)

(52) U.S. Cl. .............. 95/54; 96/8; 96/10; 96/13; 96/14; 55/524; 55/DIG. 5; 427/322; 427/407.1; 427/413

(58) Field of Classification Search .......... 95/45, 95/47–55, 8; 96/7–10, 13, 14; 55/524, DIG. 5; 427/322, 407.1, 413
See application file for complete search history.

(56) References Cited

U.S. PATENT DOCUMENTS

| | | | |
|---|---|---|---|
| 3,976,451 A * | 8/1976 | Blackmer et al. ............ 95/54 |
| 4,230,463 A | 10/1980 | Henis et al. ................. 55/16 |
| 4,508,548 A | 4/1985 | Manatt ........................ 55/158 |
| 4,527,999 A * | 7/1985 | Lee ............................. 210/654 |
| 4,606,740 A * | 8/1986 | Kulprathipanja ............ 95/47 |
| 4,776,936 A | 10/1988 | Smith et al. ............ 204/157.15 |
| 4,813,983 A | 3/1989 | Nohmi et al. ................. 55/158 |
| 4,824,444 A | 4/1989 | Nomura ....................... 95/54 |
| 4,952,220 A | 8/1990 | Langsam et al. ............ 96/13 |
| 4,976,897 A | 12/1990 | Callahan et al. ........... 264/425 |
| 5,032,149 A * | 7/1991 | Hayes ......................... 95/53 |
| 5,034,024 A * | 7/1991 | Hayes ......................... 95/54 |
| 5,042,993 A | 8/1991 | Meier et al. ................. 95/47 |
| 5,045,093 A | 9/1991 | Meier et al. ................. 95/47 |
| 5,049,167 A * | 9/1991 | Castro et al. ................ 95/55 |
| 5,067,971 A * | 11/1991 | Bikson et al. ............... 95/52 |
| 5,102,552 A * | 4/1992 | Callahan et al. ........... 210/654 |
| 5,157,058 A * | 10/1992 | Dillon et al. ............... 521/134 |
| 5,158,584 A | 10/1992 | Tamura ......................... 96/8 |

(Continued)

FOREIGN PATENT DOCUMENTS

EP    0248391 A2 * 12/1987

(Continued)

OTHER PUBLICATIONS

EPODOC/EPO Abstract of Japanese Patent Application No. JP2191533.

(Continued)

*Primary Examiner*—Jason M. Greene
(74) *Attorney, Agent, or Firm*—Ohlandt, Greeley, Ruggiero & Perle, L.L.P.

(57) ABSTRACT

A method of producing composite, hollow fibre gas separation membranes, wherein external surfaces of the porous hollow fibre tubes used in the construction of the membranes are subjected to a modification technique before the external surfaces are coated with a thin layer of selective polymer so as to increase the number of pores in the fibre surface.

42 Claims, 7 Drawing Sheets

U.S. PATENT DOCUMENTS

| | | | | |
|---|---|---|---|---|
| 5,286,280 A | | 2/1994 | Chiou | 95/45 |
| 5,332,498 A | * | 7/1994 | Rogut | 96/8 |
| 5,356,459 A | * | 10/1994 | Bikson et al. | 95/54 |
| 5,383,448 A | | 1/1995 | Tkatchouk et al. | 128/205.11 |
| 5,468,283 A | * | 11/1995 | French et al. | 95/45 |
| 5,989,319 A | * | 11/1999 | Kawae et al. | 96/11 |
| 6,017,474 A | | 1/2000 | Teo et al. | 264/41 |
| 6,093,238 A | | 7/2000 | Huf | 96/8 |
| 6,126,721 A | | 10/2000 | Nemser et al. | 95/54 |
| 6,425,936 B1 | * | 7/2002 | Sammons et al. | 95/45 |
| 6,503,295 B1 | | 1/2003 | Koros et al. | 95/51 |
| 6,540,813 B2 | | 4/2003 | Nelson et al. | 95/53 |
| 6,649,559 B2 | * | 11/2003 | Drost et al. | 502/182 |
| 6,660,062 B2 | * | 12/2003 | Liu et al. | 95/45 |
| 6,730,145 B1 | * | 5/2004 | Li | 96/10 |
| 2003/0126988 A1 | * | 7/2003 | Nelson et al. | 95/53 |

FOREIGN PATENT DOCUMENTS

| | | | |
|---|---|---|---|
| EP | 0405597 A1 | | 6/1990 |
| EP | 0422884 A1 | | 10/1990 |
| EP | 1206959 A1 | | 8/1999 |
| EP | 1108458 A1 | | 6/2001 |
| GB | 2192581 A | * | 1/1988 |

OTHER PUBLICATIONS

EPODOC/EPO Abstract of Japanese Patent Application No. JP2071826.

European Search Report (Partial), dated Jul. 5, 2004 (6 pages).

* cited by examiner

GAS SEPARATION MEMBRANES

DISCUSSION OF THE BACKGROUND ART

It has long been established that enriched oxygen air can be a beneficial aid for certain medical treatments and also that enriched oxygen air can improve the efficiency of various industrial processes. The more widespread use of oxygen rich air is, however, dependent on whether or not oxygen rich air can be supplied in a cost effective manner. Many potential applications, particularly industrial processes, usually also require large amounts of enriched oxygen air, and large volumes can only be supplied commercially, at the present time, by diluting pure or almost pure oxygen with normal atmospheric air. Pure oxygen can of course be supplied by oxygen manufacturers, as either compressed oxygen or liquid oxygen, however, the amount that can be supplied in compressed gas or liquid form is limited and the oxygen is also extremely expensive.

For large processes requiring high volumes of oxygen, the only practical alternative is to produce pure oxygen on-site by an industrial method of manufacture, such as pressure swing adsorption, vacuum swing adsorption or a cryogenic system. However, the oxygen would still be expensive, because of the high capital and energy costs associated with these methods of manufacturing oxygen. Industrial scale oxygen production units also require a large amount of space. The on-site manufacture of oxygen is therefore only realistic for industries, such as the metal and petroleum industries, which have processes large enough to have the economy of scale to justify an oxygen production plant.

Oxygen concentrators, based on membrane gas separation systems, can be used to produce enriched oxygen air. Most commercial oxygen concentrators tend to have high gas selectivity but relatively low gas permeability. Although these oxygen concentrators are able to produce reasonably pure gas streams, they generally operate at high pressures and they are usually only able to produce relatively small volumes of separated gases. Because of their high-pressure operation, these oxygen concentrators have high demands for energy. The membranes used in these types of oxygen concentrator are also prone to failure, because continual operation under high-pressure places considerable stress on the membranes.

To satisfy the potential medical and industrial applications that exist for enriched oxygen air, a low-pressure, energy efficient gas separation membrane system, which is able to produce large volumes of cost effective enriched oxygen air, is required. A typical composite hollow fibre gas separation membrane consists of two basic components, an asymmetric hollow fibre tube, which forms the porous support structure of the membrane, and a coating of a dense polymer on the outside surface of the fibre tube, which provides the gas selectivity properties of the membrane.

The gas separation performance of a composite hollow fibre membrane is therefore very dependent on the porosity of the asymmetric fibre support and on the thickness of the selective polymer layer coated onto the outside of the tube.

For example, the porous hollow fibre tube has to provide mechanical support for the selective layer; have an open porous cell structure to minimise resistance to gas transmission across the fibre tube; have no voids in the structure; and preferably have no closed pores within the structure.

The selective top layer has to be as thin as possible; be of reasonably uniform thickness; be essentially free of holes and defects; and not be so thick as to plug open pores on the outer surface of the fibre support.

An open, porous cell network in the asymmetric fibre support is essential to provide high gas transfer and permeability of gases across the hollow fibre tube. However, a very porous fibre structure, as would be expected, has poor selectivity between different gases, and the selectivity properties have to be provided by depositing a coating of dense selective polymer onto the outside surface of the fibre tube. However, the gas separation performance of the membrane is very dependent on the thickness and the quality of the selective coating deposited onto the hollow fibre support.

For example, if the open exposed pores on the outside surface of the fibre substrate are very large, it is difficult to deposit a defect free layer of the selective polymer onto the fibre support, and any holes or ruptures in the coating would have a very detrimental effect on the selective properties of the membrane.

It is also essential that the selective layer is as thin as possible, in order to provide a reasonable degree of gas permeability through the coating as well as gas selectivity. Increasing the thickness of the selective layer, to cover large open pores in the outer surface of the substrate, merely reduces the permeability of the gas separation membrane. A thick selective coating would also significantly increase the pressure differential required to effect gas separation, as gas transport through the dense selective layer is a major rate-determining step. Excessive thickening of the selective top layer can also lead to dense polymer material penetrating into the open pores of the fibre support, rather than lying on the surface of the substrate, and plugged pores can also significantly increase the resistance to gas flow through the membrane.

The practical performance of a composite hollow fibre gas separation membrane is therefore dependent on having an appropriate balance between a very porous, highly permeable fibre support and a very thin, uniform, defect free selective layer on the outer surface of the fibre support.

SUMMARY OF THE INVENTION

The present invention seeks to provide a composite asymmetric hollow fibre gas separation membrane that is not only permeable enough to produce relatively large volumes of enriched oxygen air, but is also energy efficient because it can operate at low differential pressures.

This is achieved by manufacturing the composite hollow fibre gas separation membrane in such away that the membrane has a reasonable degree of gas selectivity, whilst the membrane is so structured as to retain relatively high gas permeability.

This combination of properties enables the gas separation membrane to produce large volumes of enriched oxygen air whilst operating under relatively low differential pressures. The composite hollow fibre membrane is therefore energy efficient and is able to produce cost effective commercial supplies of enriched oxygen air.

In the invention, the hollow fibre component of the composite membrane is preferably manufactured from a readily available polymer, polyethersulfone, which is widely used to produce porous asymmetric fibres. The selective coating is preferably polydimethylsiloxane, another readily available polymer widely used in composite membranes.

The improved performance properties of the hollow fibre membrane, i.e. the high gas flow and the energy efficiency of the membrane, are therefore achieved by a combination of novel production methods, rather than by the use of exotic or relatively expensive polymer materials in the construction of the membrane.

For example, the polyethersulfone hollow fibre tube used in the membrane construction is initially manufactured in such a way that the fibre has a particularly porous structure to provide high gas permeability. However, because of its very porous structure, the outer surface of the fibre tube would actually be difficult to coat with a very thin layer of the selective polydimethylsiloxane polymer.

Overcoming the poor surface characteristics of the fibre tube, whilst retaining high gas permeability, is a particular feature of the invention. An improved outer surface, which is more suitable for coating, is achieved by subjecting the polyethersulfone fibre tube to a modification technique that not only improves the surface characteristics of the fibre tube but also further increases the porosity of the tube.

The modification technique involves the application of liquids to the outside wall of the fibre tube, which changes the structure of the pores and the polymer supports located near the outer surface of the fibre tube. The modification technique increases the number of pores in the fibre tube and also improves the relative distribution of exposed open pores and polymer supports in the outer surface of the fibre tube.

For example, the modified fibre can have up to twice as many pores as conventional polyethersulfone fibre, which results in a much higher gas flow than would normally be expected from a polyethersulfone fibre tube. The improved distribution of the exposed open pores and the polymer structures on and near the outer surface of the fibre tube also provides a much better surface to support the selective polymer layer.

This allows a very thin, uniform, defect free coating of selective polydimethylsiloxane polymer material to be deposited onto the outside surface of the tube, and the selective layer therefore retains a high degree of gas permeability as well as providing the gas selectivity properties to the membrane.

After modification and coating, the resulting composite hollow fibre membrane has a combination of gas permeability and gas selectivity properties that allows the membrane to produce high volumes of enriched oxygen air in an energy efficient manner, even though the fibre polymer and the selective polymer used to manufacture the membrane are well-established and are already widely used to produce hollow fibre membranes.

From a first broad aspect therefore, the invention provides a composite asymmetric hollow fibre gas separation membrane with a combination of permeability and selectivity properties that allows the hollow fibre membrane to operate at relatively low differential pressures. The membrane is therefore able to produce large volumes of enriched oxygen air in an energy efficient manner. The unique performance properties of the membrane are achieved by subjecting the outer wall of the fibre tube to a modification technique, which not only makes the fibre tube more porous, but also beneficially changes the outer surface of the fibre tube so that it is able to support a very thin, uniform, defect free layer of selective polymer material.

From a further aspect, the composite asymmetric hollow fibre membrane is preferably manufactured from readily available polymer materials that are already widely used to produce hollow fibre membranes, i.e. polyethersulfone polymer for the fibre and polydimethylsiloxane polymer for the selective layer. Because these particular polymers are already used to produce hollow fibre membranes, the performance properties, such as chemical and mechanical resistance, of a hollow fibre membrane manufactured from these polymer materials are well understood.

The composite hollow fibre membrane as described in the invention overcomes many of the operating problems associated with existing commercial high-pressure oxygen concentrators, which are energy intensive and can only produce relatively low volumes of enriched oxygen air. In contrast, the composite hollow fibre membrane operates at low pressures and yet is still able to produce relatively large volumes of enriched oxygen air.

BRIEF DESCRIPTION OF THE DRAWINGS

The construction and manufacture of the composite hollow fibre membrane will now be described in more detail with reference to the following figures.

DETAILED DESCRIPTION OF THE PREFERRED EMBODIMENT

Figure 1:
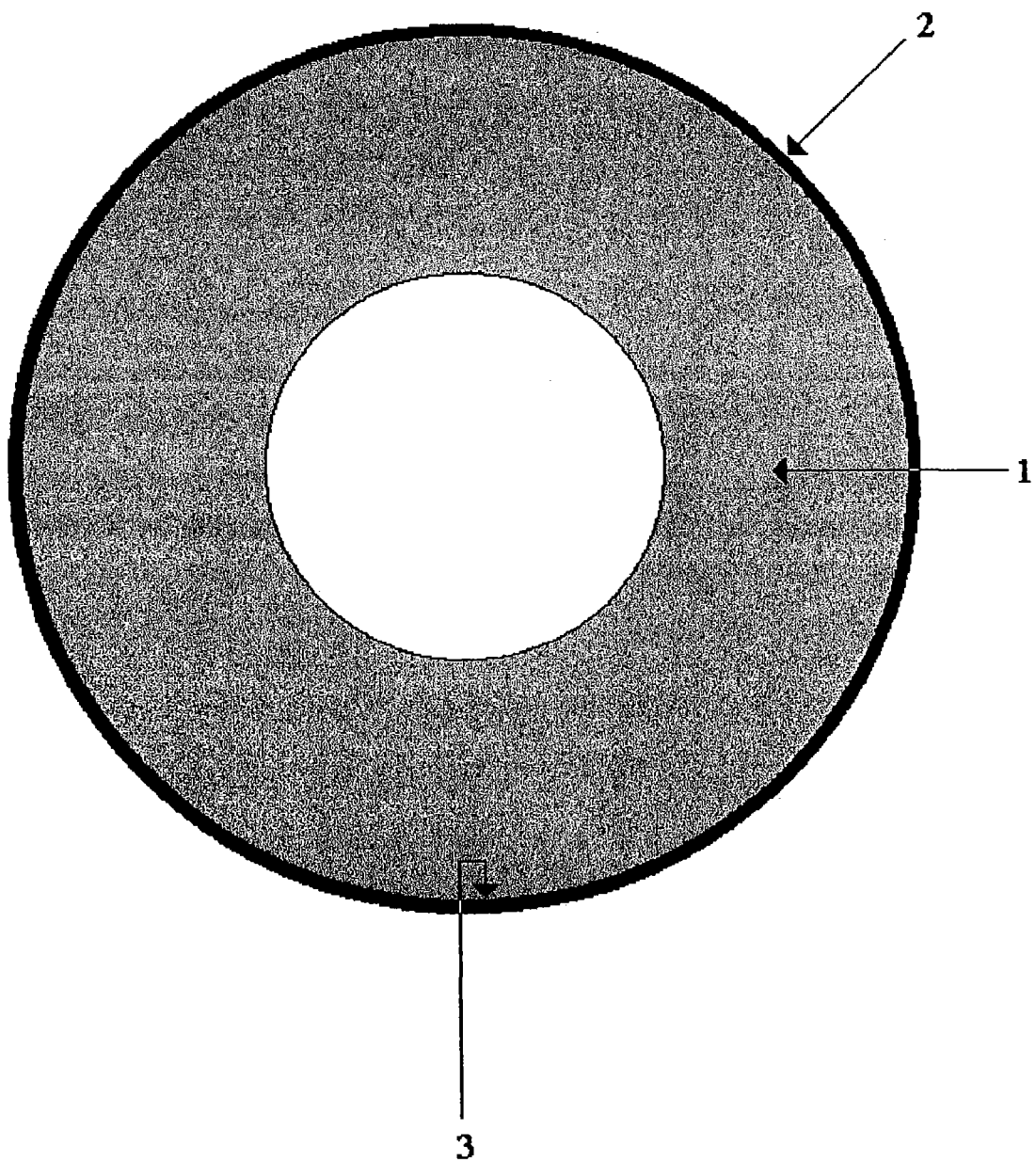
FIG. 1 is a schematic cross-sectional view of the composite hollow fibre membrane.

The basic construction of the composite hollow fibre membrane is illustrated in FIG. 1.

The membrane consists of a very porous hollow fibre tube 1, which is manufactured from polyethersulfone material. Polyethersulfone polymer is a well-established material for the production of fibre tubes and is available from a number of manufacturers, including for example BASF under their trade name Ultrason 6020E.

The hollow fibre tube 1 supports a very thin layer 2 of selective polymer consisting of a mixture of non-cross linked polydimethylsiloxane and cross-linked polydimethylsiloxane coated onto the outer surface 3 of the fibre tube 1. Polydimethylsiloxane, an elastomer of silicone rubber, is a well-established selective polymer material marketed under the trade name Sylgard-184.

Figure 2:
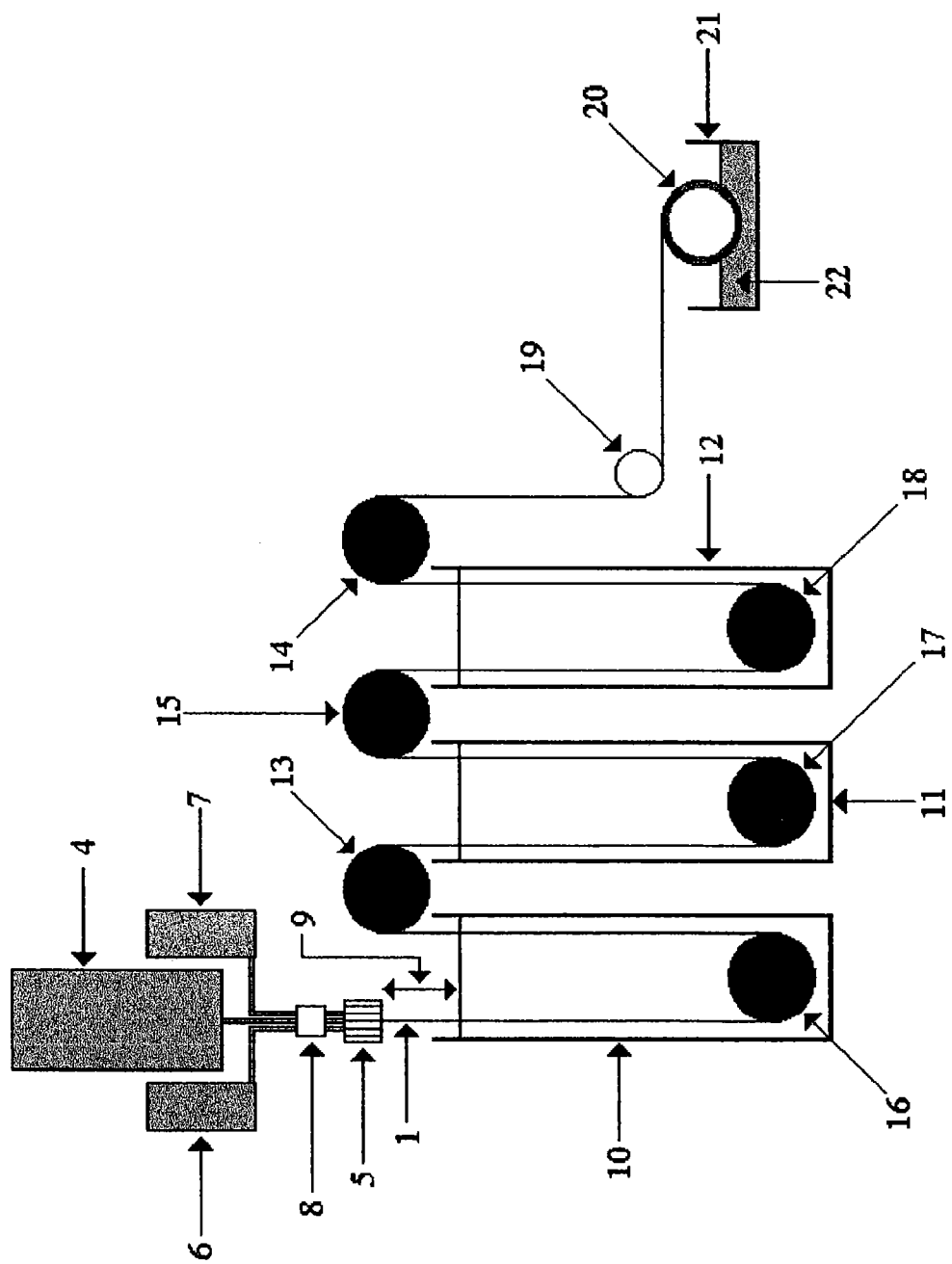
FIG. 2 is a schematic illustration of the process used to manufacture the hollow fibre tube used in the construction of the membrane.

The manufacture of the hollow fibre tube will now be briefly described with reference to FIG. 2.

Polyethersulfone polymer material is used to manufacture the hollow fibre tube. A solution is made of polyethersulfone polymer, and the solution 4 is extruded through a triple spinneret 5 having an inner orifice diameter of between 0.2 and 0.4 mm and an outer diameter of between 0.4 and 0.8 mm The polymer spinning solution 4 is a mixture of polyethersulfone, polyethylene glycol, N-methyl pyrrolidone and distilled water. The concentrations of the constituents in the spinning solution can be varied to provide specific fibre characteristics.

A mixture of N-methyl pyrrolidone, polyethylene glycol and distilled water is used as the bore liquid 6 inside the fibre tube, and a similar mixture is also used as the coagulant liquid 7 on the outside of the tube during the spinning process. The concentrations of the constituents in the bore liquid 6 and the coagulant liquid 7 can be varied, and the supply rate of the bore liquid 6 and the coagulant liquid 7 can be varied from 1 to 10 $cm^3$/sec.

The polymer spinning solution, the bore liquid and the coagulant liquid all pass through adjacent heat exchangers 8 to bring the liquids to the required process temperatures before they are fed into the spinneret 5.

The temperature of the liquids can be varied from about 5° C. to 90° C.

The extruded polyethersulfone fibre 1 from the spinneret passes through an air gap 9, which can be varied in height up to a maximum height of 50 cm, before the fibre enters the first of a series of coagulation baths. The air gap 9 between the spinneret 5 and the first bath 10 can be filled with either air or nitrogen, supplied to the air gap under controlled temperature and humidity conditions. For example, the temperature of the air or nitrogen in the air gap 9 can be varied between 5° C. and 90° C.

There are three thermostatically controlled coagulation baths, 10, 11 and 12, each having a typical diameter of about 30 cm and a typical height of about 150 cm. The first coagulation bath 10 is filled with distilled water, the second coagulation bath 11 is filled with either distilled water or isopropanol, and the third coagulation bath 12 is filled with either distilled water, isopropanol or heptane.

The temperature of the liquids in baths 10, 11 and 12 can be varied from 5° C. to 90° C., and the liquids in baths 10, 11 and 12 circulate at a flux of between 1 and 100 $cm^3$/sec.

The fibre passes over a series of adjustable rollers 15, 16, 17 and 18 as the fibre is pulled through the coagulation baths by drive wheels 13 and 14. The speed of drive wheels 13 and 14 is adjustable, so that the rotation of the drive wheels helps to control the rate at which fibre is drawn through the process. The rate of fibre extrusion is variable between 1 and 100 cm/sec.

After leaving the final coagulation bath 12, the fibre passes around a control sensor 19 before being wound onto a drum 20, which is partly submerged in distilled water 22 contained in a tank 21. The rate of rotation of drum 20 can be regulated so that the fibre is wound onto drum 20 under a reasonably constant tension.

The temperature of the water in tank 21 can be varied from 5° C. to 90° C., and the water is supplied at a rate of between 10 and 1000 $cm^3$/sec.

The process conditions that can be used to manufacture the fibre are therefore capable of wide but controlled variations. This allows the process conditions to be readily adjusted to provide extruded fibre with specific properties and qualities.

For example, in order to meet the requirements of the composite membrane described in the invention, the extrusion conditions would be set and controlled so that the fibre produced from the production process would have a very porous structure.

When sufficient fibre has been wound onto drum 20, the fibre reel is removed and held in a tank containing distilled water, circulating at a flux of 0.1 to 100 $cm^3$/sec, for between 1 and 7 days. The temperature of the distilled water can also be varied.

The fibre reel is then placed into a tank containing a mixture of isopropanol and distilled water for between 2 and 24 hours. The relative composition of the isopropanol and distilled water and the temperature of the mixture can again be varied.

The fibre is then slowly dried by feeding air, under controlled temperature and humidity conditions, across the fibres at a constant rate of between 1 and 100 $cm^3$/sec, and in a manner that avoids either pore collapse or a reduction in the porosity of the fibre. As well as being able to vary the temperature and humidity of the air flowing across the fibres, the time required to dry the fibre can be varied from about 1 to 7 days.

Once the fibre is thoroughly dried and in a stable state, the outside surface of the fibre tube is now ready to undergo a modification technique that improves the characteristics, the distribution and the size of the pores and the polymer supports within the structure of the fibre tube.

The fibre tubes are cut to an appropriate length, and the cut fibres are then assembled into bundles of a configuration suitable for potting into beds of polyurethane. Each end of each fibre tube is potted into a bed of polyurethane. When the potting compound has set, the bed of polyurethane at each end of the fibres is cut so that the hollow cores at each end of the fibre tubes are exposed and open.

The potted fibre bundles are then inserted into a pressure vessel, which holds the fibre tubes in position to allow the tubes to be subjected to the modification technique. After modification, the tubes are left in the pressure vessel and the outside of the modified tubes would then be coated with a layer of selective polymer. The finished membranes would then be of an appropriate size to be fitted directly into a gas separation module.

Alternatively, if longer membranes are eventually required, the fibre can be wound around a rectangular frame 600 mm long×500 mm wide×20 mm thick, designed so that the fibre is held on the frame in a manner that allows the fibre to be subjected to the modification technique whilst the fibre is on the frame.

The modification method primarily entails soaking the outer surface of the fibre tube with different liquids, followed by drying of the fibre tube.

The modification technique will now be described with reference to the schematic illustrations given in FIGS. 3, 4, 5 and 6.

Figure 3:
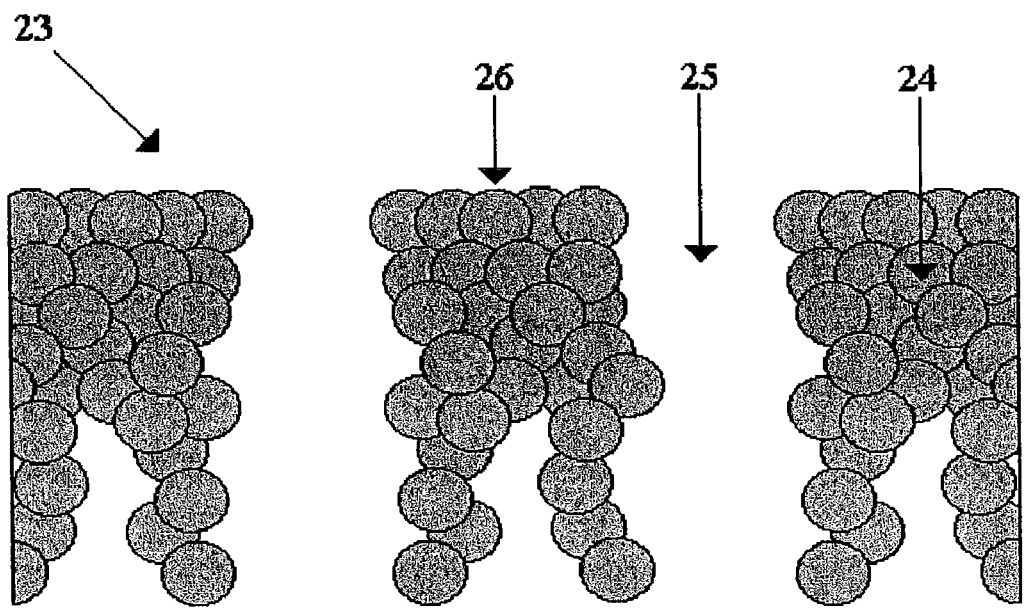
FIG. 3 is a schematic cross-sectional view of the hollow fibre tube structure close to the outer surface of the tube.

The asymmetric structure of the unmodified fibre is demonstrated in FIG. 3, where the polymer substructures 26 adjacent to the outer surface 23 of the fibre tube are illustrated schematically as grains of polymer 24, which are held together by weak hydrogen bonds. The polymer substructures 26, which make up the asymmetric fibre tube, are interspersed with pores of varying size, and some pores, such as pore 25, are exposed and open out onto the outer surface 23 of the fibre tube.

In FIG. 3, the top surfaces of the substructures 26 combine to form the outer surface of the fibre tube, i.e. the surface that, without modification, would normally provide the support for the top layer of selective polymer.

The hollow fibre tube as illustrated in FIG. 3 has been manufactured so that it is very porous, and pores, such as pore 25, which run between the polymer fibre substructures 26, have relatively large diameters.

Although the unmodified hollow fibre tube illustrated in FIG. 3 would exhibit high gas flow and permeability properties, the exposed open pores, such as pore 25, are so large that they would not provide a reliable surface to support a thin, defect free layer of selective polymer.

The structure of the hollow fibre tube is therefore modified so that the fibre tube not only becomes even more porous, but the outer surface of the fibre tube is beneficially altered so as to provide an improved surface that can support a very thin coating of selective polydimethylsiloxane polymer.

The first stage of the fibre modification process is to soak the fibre surface in a mixture of liquids, such as water and acetone, so that the liquid mixture penetrates into the exposed open pores of the fibre tube Without limiting the scope of the invention, it is believed that the presence of the liquid mixture in the pores of the fibre weakens the intergranular interactions or the hydrogen bonds between the polymer grains 24 of the substructures 26.

The acetone concentration—in the mixture can vary from 10% to 90% by weight, and a typical solvent mixture would consist of 50% acetone and 50% distilled water by weight.

Figure 4:
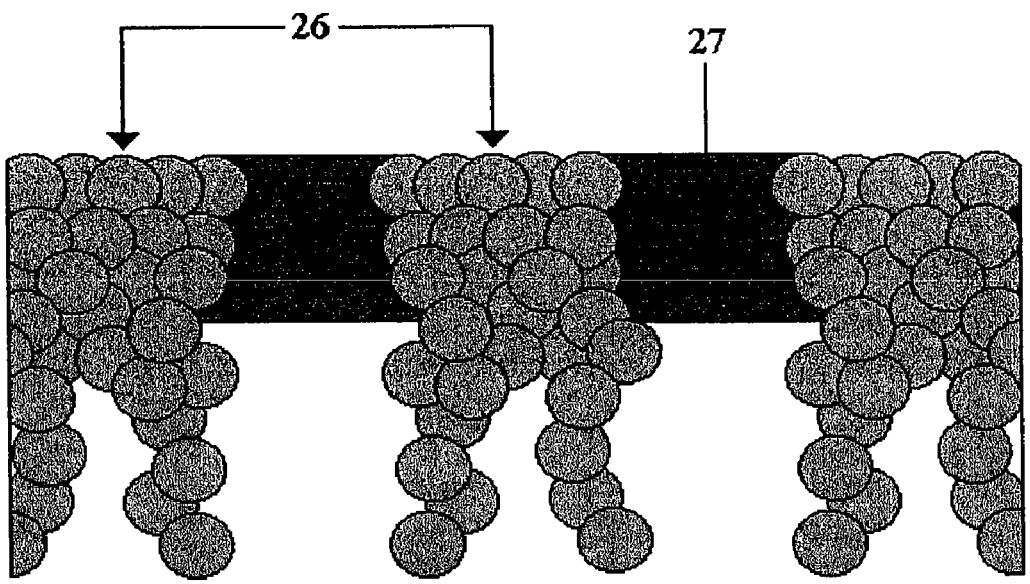
FIG. 4 is a schematic cross-sectional view of the hollow fibre tube structure illustrating the modifying solution in contact with the outer surface of the tube.

The liquid mixture is then displaced with distilled water 27, as shown in FIG. 4. Water has high surface tension, and has the added advantage that the water would not plasticize or react with the fibre polymer whilst it is in contact with the fibre.

The water is then dried from the fibre tube. A typical drying time would be about 60 seconds. As the water dries, the high surface tension of the water pulls on the polymer substructures (26 in FIG. 3), which in turn causes the polymer substructures to fracture.

Figure 5:
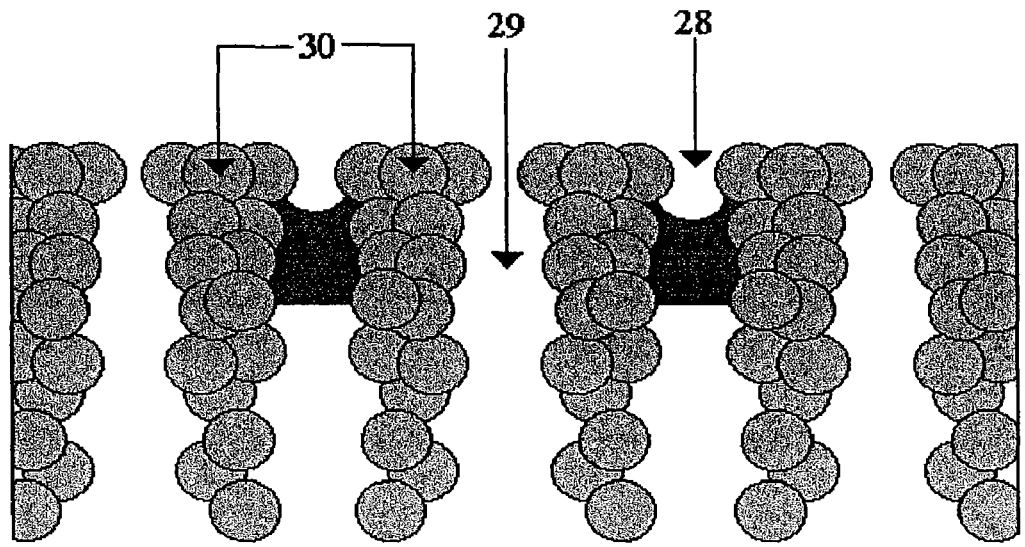
FIG. 5 is a schematic cross-sectional view of the hollow fibre tube structure illustrating the effect of the modification process on the pores and polymer structures inside the tube.

This is illustrated in FIG. 5 where the surface tension of the water 28, as it quickly dries from the pores of the fibre, pulls on the polymer substructures (26 in FIG. 3), which causes them to rupture, resulting in the formation of new pores 29 and new substructures 30. Relatively rapid drying is achieved by applying a vacuum or pressure differential to the fibre tube.

Although the original polymer substructures in the fibre tube (26 in FIG. 3) have been ruptured, the new substructures 30 formed in the fibre are stable because the water has neither plasticized nor damaged the polymer in the substructures.

The modification technique leads to the formation of many new pores within the wall of the fibre tube, which results in a substantial increase in gas flow properties and a gas permeability that can be twice the permeability of unmodified fibre.

Figure 6:
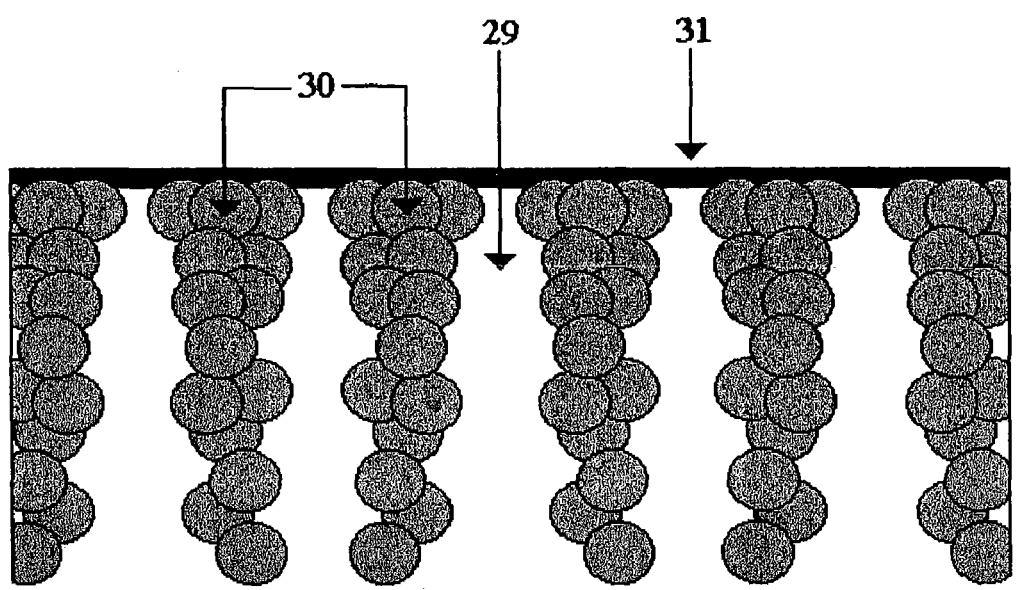
FIG. 6 is a schematic cross-sectional view of the modified hollow fibre tube structure complete with a coating of the selective polymer on the outside surface of the tube.

As illustrated schematically in FIG. 6, as well as creating more pores in the fibre tube, the modification technique also improves the distribution and relative size of the exposed open pores 29 and the interspersed polymer fibre substructures 30, which in turn provides an improved surface on the outside of the fibre tube that is able to support a very thin, uniform coating 31 of selective polymer material.

Various conditions can be changed during the modification process, so as to allow the manufacture of fibre with specific structure characteristics and permeability properties.

For example, as well as changing the composition of the modifying solution, the temperature of the process can be varied from 30° C. to 90° C., and a typical process temperature would be 50° C. The soaking time can be varied between 10 sec and 1000 sec, and a typical soaking time would be 200 sec. Drying can also be conducted in cycles so that for example, the number of drying cycles could vary from 1 to 50, and would typically be 5 cycles. The total drying time could therefore be about 300 seconds. The differential pressure maintained between the inner core and the outside of the fibre tube during the modification process can also be varied and would typically be 1 atmosphere outside the fibre tube and 0.1 atmospheres inside the tube.

After thorough drying, the modified fibre tube is now ready to be coated with a selective polymer layer (31 in FIG. 6) based on polydimethylsiloxane material.

A mixture of non cross-linked polydimethylsiloxane, (i.e. Sylgard-184), and a high molecular cross-linked polydimethylsiloxane, (i.e. Sil-Sequioxane), is first prepared, and the polydimethylsiloxane mixture is then dissolved in a suitable solvent, such as petroleum ether, liquid hydrocarbons or chloro-hydrocarbons, to form a coating solution. The fibre tubes can be left in the pressure vessel that was used to modify the tubes, and the tubes can then be coated with the polydimethylsiloxane polymer mixture whilst still in situ in the pressure vessel.

A large number of modified hollow fibre tubes, i.e. up to 20,000 tubes, would be contained in the pressure vessel, and each tube would typically be about 60 cm long. The tubes are still securely held in the pressure vessel by the beds of polyurethane potting compound at each end of the fibre tubes, and these beds of potting compound have been fixed into the pressure vessel so as to form a manifold at each end of the vessel.

One of the manifolds is connected to a vacuum pump so that the pressure inside the manifold, and hence in the inner core inside the fibre tubes, can be maintained at between 10 and 900 milliBar.

Dry nitrogen is supplied into the other manifold at a typical rate of 2 litres/second and at a typical temperature of 50° C., whilst the vessel is filled with the pre-prepared polydimethylsiloxane coating solution until the membranes are totally immersed in the solution. The pressure on the outside of the fibre tubes is then maintained at 20 to 1000 milliBar higher than the pressure on the inside of the tubes.

The tubes are submerged in the coating solution for an appropriate length of time, and the solvent is then extracted to leave a coating of the selective polydimethylsiloxane polymer mixture deposited onto the outside surface of the fibre tubes.

Hot air, at a typical temperature of 50° C. and a typical supply rate of 50 litres/sec, is blown across the outside of the coated tubes for typically 5 minutes to partially dry the membranes. The membranes are then removed from the vessel and they are allowed to dry slowly for typically 2 hours under ambient temperature and pressure conditions, until the membranes are completely dry.

Because the modification technique produces fibre tube with an outer surface that is particularly suitable for coating, the layer of selective polymer deposited onto the tube will be thin, typically between 0.1 and 1.0 microns thick, uniform and defect free.

The coating process conditions are capable of being varied so that the quality and thickness of the selective coating can be readily adjusted.

For example, the mixture of polydimethylsiloxane coating constituents and the actual coating solvent can be varied. The time period, the differential pressures and the temperature conditions inside the coating vessel can also be varied, as can the conditions used to finally dry the coated hollow fibre membranes.

The modified composite hollow fibre membranes from the coating process will have gas separation properties that would allow the membranes to be used directly in many commercial applications requiring large volumes of enriched oxygen air, once the membranes have been fitted into an appropriate gas separation module.

However, for applications requiring air that is more enriched with oxygen, the gas selectivity properties of the membranes can be improved even further by subjecting the coated surface of the membranes to a plasma discharge treatment technique. Such techniques are known in the art.

Coated hollow fibres are placed between two cooled copper electrodes in a plasma chamber. The pressure inside the chamber is maintained at 0.1 to 2 torr and the chamber can contain nitrogen, oxygen, argon, helium or mixtures of such gases. The gas flux can vary between 0.1 and 10 $cm^3$/sec.

A typical voltage of 500 volts on the high-frequency electrodes produces a high-frequency plasma discharge, and the coated fibres can be subjected to the plasma discharge for varying lengths of time.

The plasma treatment technique can significantly improve the gas selectivity properties of the membrane. For example, some composite membranes modified as described earlier are able, under certain conditions, to produce enriched oxygen air containing up to 35% oxygen. After plasma treatment, some modified/plasma treated composite membranes are able to produce enriched oxygen air containing up to 50% oxygen.

From a further aspect therefore, the modified composite membranes, which already have a good combination of gas selectivity and permeability properties, can have their gas selectivity properties improved even further by subjecting the selective coating on the outside of the membrane to a plasma treatment technique. Composite hollow fibre membranes can therefore be prepared with particular gas separation properties that are able to meet the specific requirements of the end-use application.

For commercial use, the modified composite hollow fibre membranes described in the invention, with or without the optional plasma treatment, have to be packed into a gas separation module, which allows appropriate differential pressures to be applied between the outside wall and the inner core of the membranes, so as to enable the membranes to separate normal atmospheric air into oxygen rich and nitrogen rich fractions.

For example, the differential pressure can be achieved by applying a positive pressure to the outside of the hollow fibre membranes in the gas separation module. The positive pressure forces the normal air situated on the outside of the membranes through the selective layer on the outer surface of the membranes, so that the air is selectively enriched with oxygen as it passes through the selective coating. The enriched oxygen air is then extracted from the hollow cores inside the membranes.

Alternatively, a vacuum can be applied to the inner cores of the hollow fibre membranes, so that the vacuum created inside the fibre tubes draws the normal air situated on the outside of the membranes through the selective coating on the outer surface of the membranes, so that the air is selectively enriched with oxygen as it passes through the selective coating.

The permeable hollow fibre membrane, as described in the invention, is able to separate gases by means of relatively low differential pressures, and therefore a vacuum system, which draws ,air from the outside to the inside of the membrane, is the preferred method of achieving the required differential pressure.

Figure 7:
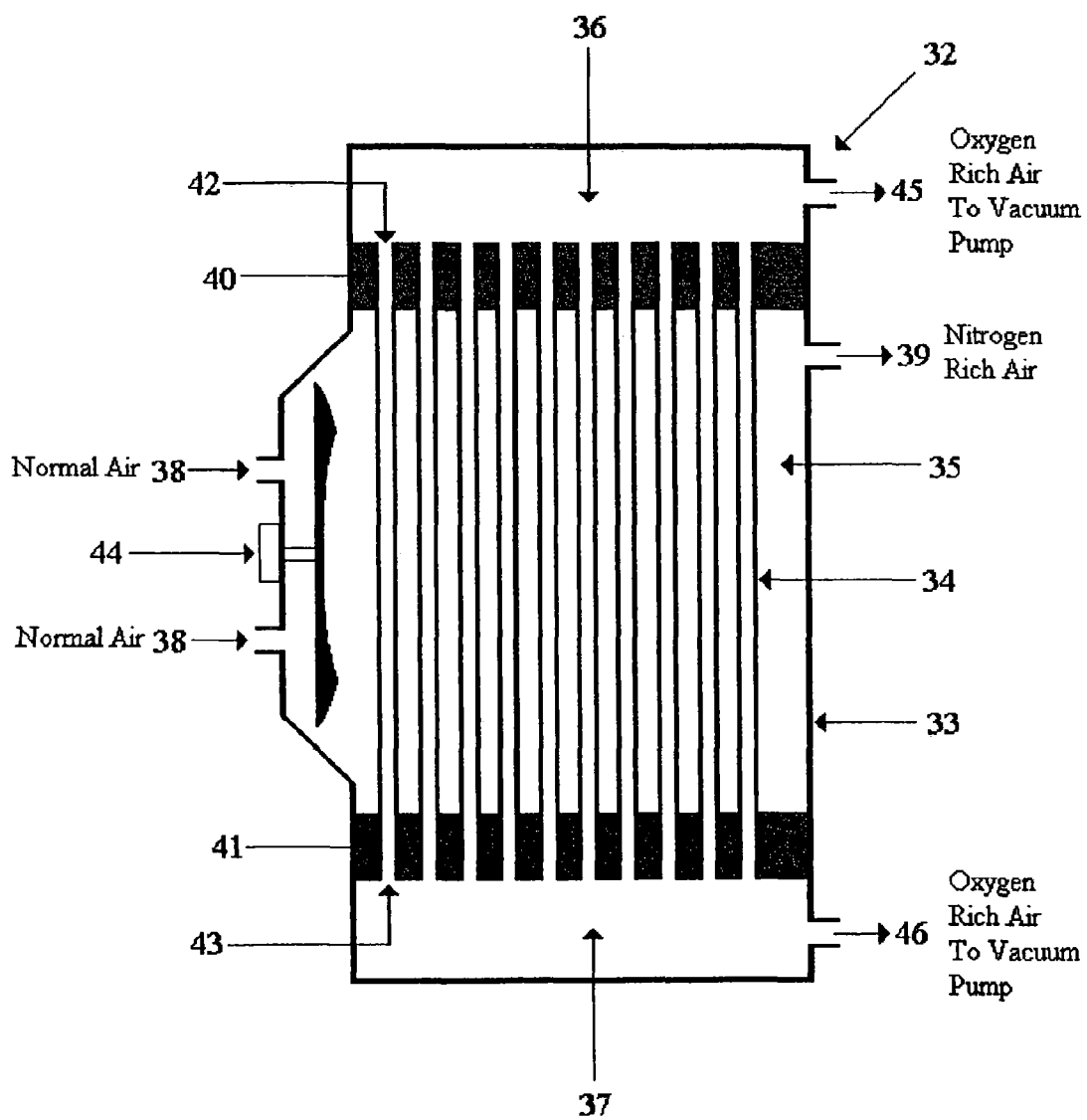
FIG. 7 illustrates schematically, in cross-section, a typical vacuum driven gas separation module to contain the aforementioned composite hollow fibre membranes.

FIG. 7 illustrates schematically, in cross-section, a typical vacuum driven gas separation module to contain the aforementioned composite hollow fibre membranes. Because the composite hollow fibre membranes, as described in the invention, have retained high gas permeability, gas separation can be achieved by applying a relatively light vacuum of about 0.5 atmospheres to the inner core of the membranes.

In contrast to many commercially available oxygen concentrators, the casing 33 of the gas separation module 32 can therefore be manufactured from relatively lightweight, albeit pressure resistant, materials, such as for example lightweight metals, rigid plastics, or combinations of such lightweight materials.

From a further aspect therefore, because the gas separation membranes described in the invention are able to function effectively under low differential pressure conditions, the gas separation module containing the membranes can be manufactured from relatively lightweight materials. Low-pressure operation also causes less wear and tear to the asymmetric membranes packed inside the gas separation module, and the membrane module will therefore have a reliable and long operational life.

The gas separation module 32, which can be of either a cylindrical or a rectangular elongated shape, contains a large number of densely packed hollow fibre membranes 34 that are aligned in a substantially parallel manner. The membranes 34 are positioned inside module 32 so that when normal atmospheric air, i.e. air consisting of 21% oxygen, 79% nitrogen, is introduced into the module, the air is able to move freely between and around the outside surfaces of the hollow fibre membranes.

The hollow fibre membranes 34 are located inside module 32 in such a manner that three chambers are formed inside module 32, a retentate chamber 35 and two evacuation chambers 36 and 37. The retentate chamber 35 would simultaneously contain fresh normal air, which is continually entering module 32 through air inlets 38, and the retentate nitrogen rich air left from the gas separation process, which can exist through outlet 39. The evacuation chambers 36 and 37 contain the permeate oxygen rich air from the gas separation process.

Each end of each hollow fibre membrane is firmly located in beds 40 and 41 of suitable potting compound, such as polyurethane, so that the top end 42 and the bottom end 43 of each membrane is open and leads to the evacuation chambers 36 and 37 respectively.

Normal air, at ambient temperature and pressure, enters module 32 through ports 38. If necessary, the air can be pre-filtered by means of a standard air filter (not illustrated in FIG. 7) before entering module 32.

A low energy fan 44 draws the air into module 32 through ports 38 and fan 44 then gently blows the air between and across the outside surfaces of the hollow fibre membranes 34 located in chamber 35.

A vacuum, of between say 0.3 and 0.8 atmospheres, and most preferably a vacuum of about 0.5 atmospheres, is applied to ports 45 and 46 by a vacuum pump (not illustrated in FIG. 7).

A vacuum is then created in chambers 36 and 37 and subsequently in the hollow cores inside the membranes 34. The vacuum created in the hollow cores of the membranes 34 draws air through the selective coating on the outside surface of the membranes 34, and the coating selectively allows more oxygen to pass through the membranes than nitrogen.

Permeate oxygen rich air fills chambers 36 and 37. The vacuum pump continually evacuates the enriched oxygen air from chambers 36 and 37 and transfers the oxygen rich air to the particular end-use application that requires an enriched oxygen atmosphere.

The retentate nitrogen rich air that remains on the outside of the hollow fibre membranes 34 in chamber 35 is gradually displaced out of chamber 35 through exit port 39 by the fresh air that is continually being blown through chamber 35 by fan 44. The nitrogen rich air would normally be released to the outside atmosphere.

The gas separation module can be varied in size to suit particular end-use applications and their specific demand for enriched oxygen air.

The gas separation modules can also be used for processes requiring very large amounts of enriched oxygen air by combining gas separation modules together in multiples and operating the modules in parallel, using either a common vacuum pump or a number of vacuum pumps to create the required vacuum conditions within the modules. Because the gas separation modules operate under low pressure and they are relatively lightweight, it is possible to combine an appreciable number of modules together to provide an integrated gas separation system that is able to produce the very large volumes of enriched oxygen air required by some combustion and industrial processes.

The performance properties of composite hollow fibre membranes, as described in the invention, will now be illustrated by reference to the examples given in Tables 1, 2 and 3, which are all based on practical commercial-scale gas separation systems.

The examples given in Tables 1, 2 and 3 demonstrate how gas separation modules containing the composite hollow fibre membranes can be combined together in multiples to provide integrated gas separation systems that are able to produce very large volumes of enriched oxygen air. The examples clearly demonstrate that combining gas separation modules together in multiples is not only energy efficient, but the resulting integrated gas separation systems are also able to produce very large volumes of enriched oxygen air. In each example the selective coating is between 0.1 and 1.0 microns thick.

TABLE 1

Composite Hollow Fibre Gas Separation System; Example 1

| Property | Value |
| --- | --- |
| Internal diameter of fibre | 0.2 mm |
| External diameter of fibre | 0.4 mm |
| Fibre polymer | Polyethersulfone |
| Selective coating | Polydimethylsiloxane mixture |
| Membrane permeability | 2950 nlitres/m$^2$/hour/atmosphere |
| Membrane selectivity oxygen to nitrogen | 2.2 |
| Module size | 4 m × 30 cm diameter |
| Number of modules | 12 |
| System space requirement | 3.5 m$^3$ |
| Pump | Travaini TRSK 5002 |
| Pump operation | 197 rpm, capacity 276 m$^3$/min |
| Vacuum pressure | 0.5 atmospheres |
| Pressure outside membranes | 1 atmosphere |
| Composition of the enriched oxygen air | 27% oxygen, 73% nitrogen |
| Volume of enriched oxygen air produced | 145 m$^3$/min |
| Pump power consumption | 215 kW |
| Energy consumption | 244 kWhr/tonne of added oxygen |

TABLE 2

Composite Hollow Fibre Gas Separation System: Example 2

| Property | Value |
| --- | --- |
| Internal diameter of fibre | 0.6 mm |
| External diameter of fibre | 0.8 mm |
| Fibre polymer | Polyethersulfone |
| Selective coating | Polydimethylsiloxane mixture |
| Membrane permeability | 2950 nlitres/m$^2$/hour/atmosphere |
| Membrane selectivity oxygen to nitrogen | 2.2 |
| Module size | 80 cm × 70 cm × 10 cm |
| Number of modules | 750 |
| System space requirement | 42 m$^3$ |
| Pump | Travaini TRSK 5002 |
| Pump operation | 197 rpm, capacity 276 m$^3$/min |
| Vacuum pressure | 0.6 atmospheres |
| Pressure outside membranes | 1 atmosphere |
| Composition of the enriched oxygen air | 26% oxygen, 74% nitrogen |
| Volume of enriched oxygen air produced | 165 m$^3$/min |
| Pump power consumption | 197 kW |
| Energy consumption | 240 kWhr/tonne of added oxygen |

TABLE 3

Composite Hollow Fibre Gas separation System: Example 3

| Property | Value |
| --- | --- |
| Internal diameter of fibre | 0.2 mm |
| External diameter of fibre | 0.4 mm |
| Fibre polymer | Polyethersulfone |
| Selective coating | Polydimethylsiloxane mixture |
| Outer coating | Plasma treated |
| Membrane permeability | 200 n litres/m$^2$/hour/atmosphere |
| Membrane selectivity oxygen to nitrogen | 3.0 |
| Module size | 4 m × 30 cm diameter |
| Number of modules | 85 |
| System space requirement | 24 m$^3$ |
| Pump | Travaini TRSK 5002 |
| Pump operation | 197 rpm, capacity 276 m$^3$/min |
| Vacuum pressure | 0.4 atmospheres |
| Pressure outside membranes | 1 atmosphere |
| Composition of the enriched oxygen air | 32% oxygen, 68% nitrogen |
| Volume of enriched oxygen air produced | 108 m$^3$/min |
| Pump power consumption | 215 kW |
| Energy consumption | 174 kWhr/tonne of added oxygen |

The energy efficiency of the hollow fibre gas separation membranes is further illustrated in the Table 4, which compares the amount of energy required to produce one tonne of added oxygen from the gas separation systems described in Tables 1, 2 and 3, with the amount of energy required to produce one tonne of oxygen onsite by the established industrial oxygen manufacturing methods.

The space needed for each method of oxygen production, expressed as the approximate floor area of the plant required to produce the oxygen, is also compared in Table 4. This clearly shows that the membrane gas separation systems described in Tables 1, 2 and 3 are clearly very space efficient compared to the industrial methods of manufacturing pure oxygen.

As shown in Table 4, the hollow fibre membrane gas separation systems that are given as examples in Tables 1, 2 and 3 are capable of producing large volumes of enriched oxygen air at an energy cost that is very competitive with the established industrial methods of manufacturing pure oxygen.

No estimates have been included in Table 4 for other operating costs, such as capital and running costs, which would be associated with each particular oxygen production system.

However, it can be assumed that the gas separation membrane systems described in Tables 1, 2 and 3 would have much lower capital and operating costs than the industrial methods of manufacturing oxygen. Industrial oxygen plants are very expensive, for example, a vacuum swing adsorption oxygen plant could cost up to £3 million, and a cryogenic oxygen plant could cost over £5 million.

TABLE 4

Comparison of Oxygen Production Methods

| Production Method | Energy Consumption kWhr/tonne of oxygen | Space Requirement plant floor area m$^2$ |
|---|---|---|
| Gas separation membrane system (As in Table 1) | 244 | 4 |
| Gas separation membrane system (As in Table 2) | 240 | 16 |
| Gas separation membrane system (As in Table 3) | 174 | 12 |
| Pressure swing adsorption Oxygen production system | 350–500 | Up to 50 |
| Vacuum swing adsorption Oxygen production system | 290–350 | Up to 900 |
| Cryogenic Oxygen production system | 270–306 | 1000+ |

The efficiency of the industrial on-site methods of manufacturing oxygen, and therefore their energy costs, is also very dependent on the scale of production, i.e. the larger the plant, the more efficient the oxygen production. In contrast, the energy demands of the hollow fibre membrane gas separation systems, in terms of kWhr/tonne of added oxygen, remain fairly constant when using the same hollow fibre membranes inside the gas separation modules, irrespective of the size of the system.

A further important feature of the hollow fibre membrane gas separation system is that the system is extremely safe to use. As well as being a low-pressure system, the enriched oxygen air produced by the system is virtually no more hazardous that normal atmospheric air.

In contrast pure or high purity oxygen is a potential safety hazard because of its ability to encourage spontaneous combustion. The release of pure oxygen from an oxygen-based process is a major potential hazard because if the oxygen comes into contact with a fuel or other combustible materials there is an immediate risk of fire or even of explosion.

Pure oxygen has to be handled with care at all times and any materials that come into contact with pure oxygen have to be fully compatible with oxygen. Pipes containing oxygen have to be leak proof and fire resistant, and they must be separated and isolated from any pipes that contain sources of fuel Oxygen production equipment and oxygen compressors also need to be completely isolated from other process plant and equipment. Combustion in the presence of pure oxygen can also significantly increase combustion and flame temperatures, and pure oxygen also increases the risk of oxidation and corrosion of process components. These factors need to be taken into account when designing combustion equipment that utilises pure oxygen as the oxidising agent. Industrial processes that use pure oxygen are also dependent on a continual supply of oxygen in order to maintain plant efficiency and to control environmental emissions. Any disruption to the supply of oxygen would have an immediate and dramatic effect on the efficiency of the process, and could well necessitate closure of the plant until the oxygen supply was resumed.

In contrast, enriched oxygen air does not encourage spontaneous combustion and leakage of enriched oxygen air from the gas separation system or supply pipes would not be an appreciable safety hazard. Because the gas separation system operates under low pressures, there is also very little risk of a pressure blow out.

Membrane modules contain a large number of hollow fibre membranes and a failure of either an individual membrane or a small number of membranes would have very little effect on the composition of the enriched oxygen air coming from the module. Even if there were a total failure of all the membranes in the module, which is extremely unlikely, the air from the system would simply revert back to its normal atmospheric composition of 21% oxygen, 79% nitrogen.

Although the use of enriched oxygen air can significantly improve the efficiency of many industrial processes, the performance of the process would be less dependent on the precise level of oxygen in the enriched oxygen air, than the performance of processes that critically rely on pure oxygen. For example, if the supply of enriched oxygen air were disrupted for any reason, most industrial processes would be able to revert back to normal atmospheric air for a short time until the supply of enriched oxygen air was restored.

From a further aspect therefore, because the oxygen enrichment gas separation system operates at low differential pressure, and the system produces enriched oxygen air rather than pure or high purity oxygen, the system is not only safe to use but also provides a high degree of process reliability.

Potential applications for the low-pressure hollow fibre gas separation system will now be discussed with particular reference to some typical industrial and medical end-uses.

Air with a slightly increased oxygen content of between, for example, 2% and 7% above normal (i.e. between 23% oxygen, 77% nitrogen and 28% oxygen, 72% nitrogen) has potential benefits in a number of end-use applications, including industrial processes, combustion processes, water treatments and medical treatments.

The membrane gas separation system as described in the invention is able to produce large volumes of such enriched oxygen air. The size, construction and the gas separation properties of the system can also be varied so that the system is able to supply the specific amount of enriched oxygen air, to the required oxygen concentration, to meet the needs of particular end-use applications.

With regard to medical treatments and related high altitude applications, an enriched oxygen atmosphere in an enclosed space or environment, such as a medical ward or a dormitory at altitude, can provide beneficial health effects for people who are suffering from various physical ailments or physical stress.

For example, patients that could benefit from treatment with enriched oxygen air include people with respiratory, pulmonary or asthmatic conditions; patients with blood cell deficiencies or heart ailments; patients recovering from major surgery; patients in intensive care; and geriatric and paediatric patients suffering from breathing difficulties. Similarly, people who are working at or are based at altitude for prolonged periods could also benefit from time spent in an enriched oxygen atmosphere.

As altitude increases, the proportion of oxygen in the air remains constant, however, the atmospheric pressure falls, as shown in Table 5.

TABLE 5

| Height above sea level Feet | Height above sea level Meters | Ambient Pressure Kpa |
|---|---|---|
| 0 | 0 | 101.4 |
| 4750 | 1448 | 84.0 |
| 8000 | 2438 | 76.7 |
| 10000 | 3048 | 72.0 |
| 12000 | 3658 | 64.0 |
| 15000 | 4572 | 57.4 |
| 17500 | 5334 | 50.7 |
| 25000 | 7620 | 38.6 |

The reduced partial pressure of oxygen at high altitude makes breathing more difficult, decreases the transfer of oxygen to the blood stream and increases the risk of severe hypoxia. The lack of oxygen at high altitudes can severely limit the ability of people to work, concentrate and sleep properly, and in extreme circumstances it can lead to debilitating altitude sickness.

Increasing the oxygen content in the breathable air at high altitudes can have beneficial health effects. For example, a 1% increase in the oxygen concentration of air inhaled at altitude is equivalent to a drop in altitude of about 300 metres. Breathing air containing 28% oxygen, i.e. an air composition of 28% oxygen, 72% nitrogen, at high altitude is therefore equivalent to reducing the altitude by about 2100 metres.

Research on working conditions at altitude has shown that if people are accommodated in a dormitory with an enriched oxygen atmosphere they are able to sleep better and the next day the oxygen level in their blood stream is higher. This enables people to function and work better at altitude for longer periods of time, and without the need for supplementary portable supplies of oxygen, i.e. cylinders of compressed oxygen, which are heavy, cumbersome and restrict movement.

It has also been established that acclimatisation in an enriched oxygen atmosphere at a low altitude is an effective means of improving the ability of people to function and work at a higher altitude.

For example, acclimatisation in an atmosphere containing 28% oxygen, i.e. an air composition of 28% oxygen, 72% nitrogen, at a height of 3000 metres would benefit people who have to then work at an altitude of 5000 metres.

Pure oxygen is already used for emergency medical treatments, i.e. as a breathing aid in hospitals, and to help workers at high altitudes. For these particular end-use applications the oxygen is usually supplied by a manufacturer of oxygen, either as compressed gas in cylinders or as liquid oxygen in tanks. Supplying pure oxygen in cylinders and tanks involves high production, packaging and distribution costs and the oxygen is therefore extremely expensive.

Where pure oxygen is used for medical treatment, such as in hospitals, the oxygen could be one of a variety of gases that may be stored in cylinders onsite for treatment purposes, which increases the risk of the wrong gas being accidentally administered to patients.

Oxygen concentrators, which use gas separation membranes to separate normal air into an oxygen rich fraction and a nitrogen rich fraction, are commercially available. Although industrial oxygen concentrators have a reasonable degree of selectivity between oxygen and nitrogen, they tend to have a relatively low gas flux and they require high operating pressures, usually at least 7-bar pressure, to force the air through the gas separation membranes.

The need to use high-pressure compressors to produce oxygen rich air from the currently available commercial oxygen concentrators results in a high demand for energy, and the low gas flux also limits the output from the concentrators. In contrast, the hollow fibre gas separation system described in the invention operates under low differential pressures, and is therefore able to produce large volumes of enriched oxygen air in an energy efficient manner.

Figure 8:
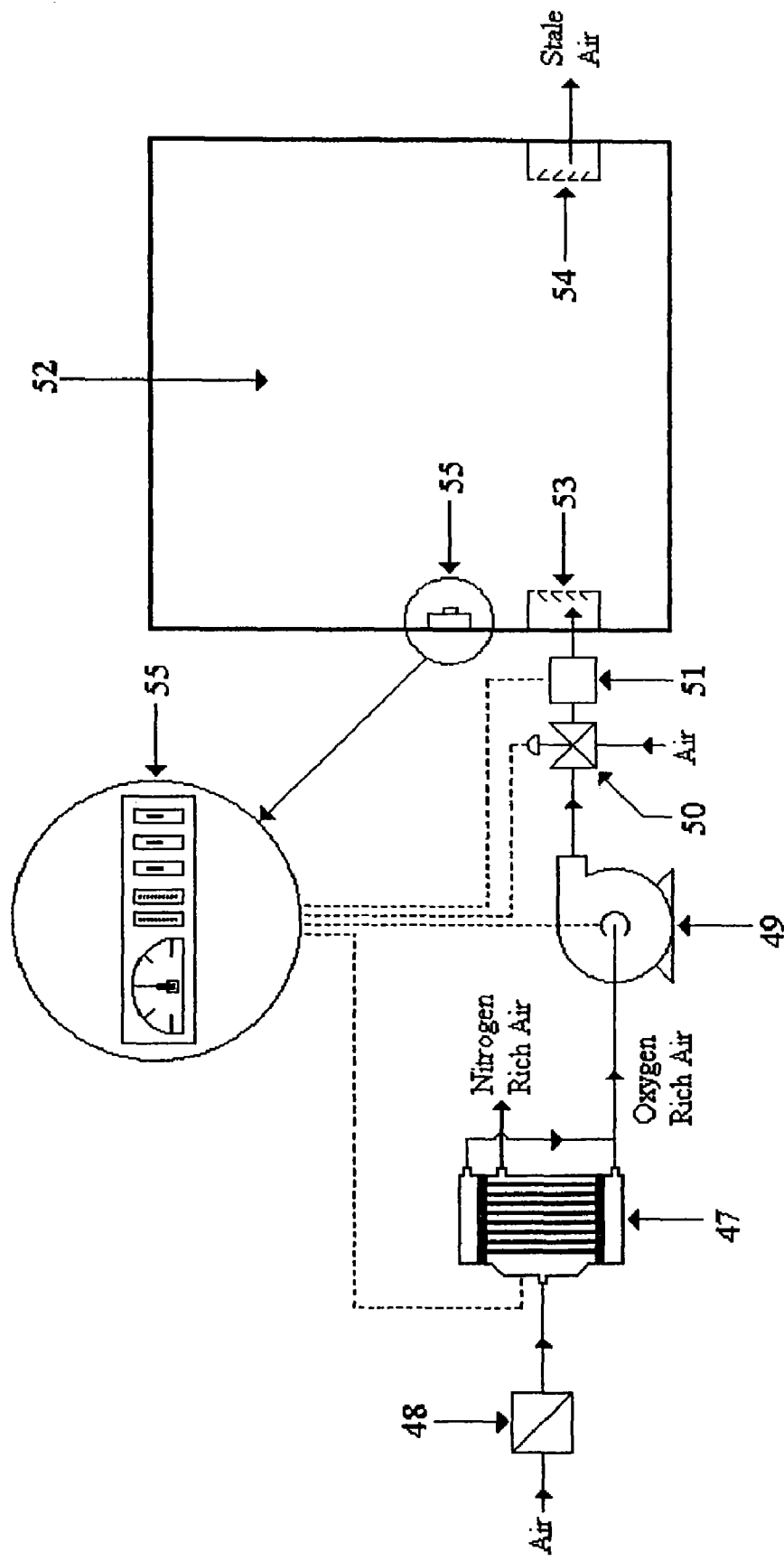
FIG. 8 illustrates a typical gas separation system, based on using the hollow fibre membranes described in the invention.

By way of example, FIG. 8 illustrates a typical gas separation system, based on using the hollow fibre membranes described in the invention, designed to provide an enriched oxygen atmosphere to an enclosed space or environment, such as, for example, a hospital ward or a high altitude dormitory.

Operation of the fan inside the gas separation module 47 draws air through a standard air filter 48 and into the module 47. The fan then blows the air across the membranes located inside module 47.

A vacuum pump 49 creates a negative pressure of about 0.5 atmospheres inside the inner core of the hollow fibre membranes located in module 47.

The pressure differential created between the inside and the outside of the membranes by the vacuum pump 49 encourages air to pass through the walls of the membranes, and the air is selectively separated into oxygen rich and nitrogen rich fractions.

The permeate oxygen rich air fraction passes into the evacuation chambers in module 47. The nitrogen rich air fraction left in the retentate chamber in module 47 would usually be discharged to the outside atmosphere.

The oxygen rich air in the evacuation chambers in module 47 is fed by the vacuum pump 49 to a regulating valve 50 and then to an oxygen sensor 51. An analysis of the oxygen rich air by the oxygen sensor 51 will indicate whether or not the oxygen concentration in the oxygen enhanced air stream needs to be adjusted by valve 50.

For example, the regulating valve 50 can, if necessary, allow normal atmospheric air to be mixed with the enriched oxygen air coming from module 47, until the enriched air contains the required concentration of oxygen.

The enriched oxygen air, to the required composition, is then fed into the enclosed space 52 that requires an enhanced oxygen atmosphere through vent 53.

The system would usually be controlled from a panel 55 located inside the enclosed space 52, although the control panel could also be located adjacent to the gas separation system if this was more convenient The control panel 55 would, for example, control the supply of electricity to the fan in module 47 and to the vacuum pump 49, control the vacuum and the flux produced by vacuum pump 49, and control the oxygen concentration in the air in enclosed space 52.

The control panel 55 would indicate the concentration of oxygen in the enriched air coming from the vacuum pump 49, as measured by sensor 51, as well as the actual oxygen concentration in the enclosed space 52, as measured by an additional oxygen sensor located inside the enclosed space.

The oxygen rich air would be supplied constantly at a predetermined rate to the enclosed space 52 from module 47 by vacuum pump 49, so that the enclosed space 52 was continually being replenished with fresh enriched oxygen air.

The enclosed space 52 would preferably be reasonably well sealed, to prevent excessive loss of the enriched oxygen air to the outside ambient atmosphere, although the enclosed space 52 would not need to be hermetically sealed.

Stale air in the enclosed space 52 would be removed through vent 54 with the aid of an extractor fan, at a rate that could also be controlled by control panel 55.

The enriched oxygen air supplied by the gas separation module 49 could be an integral part of a typical air conditioning system. For example, before being supplied to the enclosed space 52 the oxygen rich air could be heated or cooled, as appropriate, by passing the air through a suitable heat exchanger (not shown in FIG. 8).

In fact, the air filter 48, the gas separation module 47, the vacuum pump 49, the regulating valve 50, the oxygen sensor 51 and the control system 55 can all be packaged together into a single gas separation unit that could be fitted directly into an existing air conditioning or air supply system.

The size of the membrane module 47 and the vacuum pump 49 can be varied so as to provide sufficient enriched oxygen rich air, to the desired oxygen concentration, to suit the particular requirements and the internal volume of the enclosed space 52.

For example, the enclosed space 52 could be large enough to accommodate perhaps eight to twelve or more people, a typical size for many medical applications that could benefit from an enriched oxygen atmosphere, such as operating theatres, operating recovery rooms, intensive care wards, paediatric wards, geriatric wards and therapy rooms.

A smaller enclosed space 52, suitable for say two to four people, could be used, for example, in either specific health care applications or to provide overnight dormitory accommodation at high altitude locations.

The system is also capable of being scaled down even further in size to provide a compact, portable unit, by using a very small membrane module and small vacuum pump, powered by batteries, rechargeable batteries or other suitable portable means of power supply.

For example, the enclosed space 52 could be a small, semi-rigid, collapsible, lightweight plastic unit, similar in form to an oxygen tent Typical applications for such a unit would include individual patient care on a hospital ward, or as an emergency recovery unit for a high altitude worker or climber suffering from hypoxia or altitude sickness.

The enclosed space 52 could in fact be as small as a simple breathing mask, linked to a very lightweight and compact portable gas separation unit. The system would allow individuals to be mobile whilst breathing oxygen rich air, which would be particularly useful for workers at high altitudes, for emergency medical treatments and for patients with physical ailments that are recovering at home.

The breathing mask would incorporate a valved control mechanism to allow exhaled air to be expelled from the mask before the user inhaled the enriched oxygen air from the gas separation unit.

The nitrogen rich air from the gas separation systems described above would normally be discharged to the ambient outside atmosphere. However, there may well be applications where the nitrogen rich air fraction could be used as the atmosphere in an enclosed space, such as, for example, to replicate the low partial pressure of oxygen at high altitudes. Such a facility, based at low altitudes, could be used for high altitude acclimatisation and training.

With regard to industrial applications, pure oxygen is already used in a number of industrial processes, and particularly for large processes in the metal, glass, paper, petrochemical and gasification industries where economies of scale can justify the high capital and energy costs involved in manufacturing pure oxygen on-site.

However, there are still many industrial processes where the use of oxygen could be beneficial, but the high cost of producing pure oxygen precludes its use, and it is in these particular areas that a cost effective supply of enriched oxygen air would have potential.

For example, research has shown that the efficiency of most combustion processes, including engines, boilers, incinerators, furnaces, kilns, and rotary kilns, which have traditionally relied on normal air as the oxidant medium, would be significantly improved by the use of an enriched oxygen air supply in the combustion process.

Certain waste based fuels, such as for example municipal solid waste, hazardous waste, clinical waste and certain waste based liquid fuels, can be of variable quality and contain high amounts of moisture. Such waste based fuels can be difficult to burn in a reliable, clean and efficient manner.

The incineration of waste materials is also becoming increasingly more regulated, and much tighter emission limits, such as those specified in the EU Waste Incineration Directive, are being imposed on waste combustion processes.

Research has established that even relatively low levels of oxygen enrichment, i.e. as little as 2% to 3% extra oxygen, not only improves the combustion of some waste based fuels, but also significantly reduces the amount of noxious pollutants that are released to the atmosphere from the combustion process.

Research has also shown that an enriched oxygen combustion atmosphere containing about 4% to 6% extra oxygen, i.e. an atmosphere of 25% oxygen, 75% nitrogen to 27% oxygen, 73% nitrogen, often provides the optimum combustion conditions required to combust many fuels that would otherwise burn very poorly. Under these combustion conditions, most fuels are able to burn efficiently and in a manner whereby most of the prescribed exhaust gas pollutants are maintained at relatively low levels.

Figure 9:
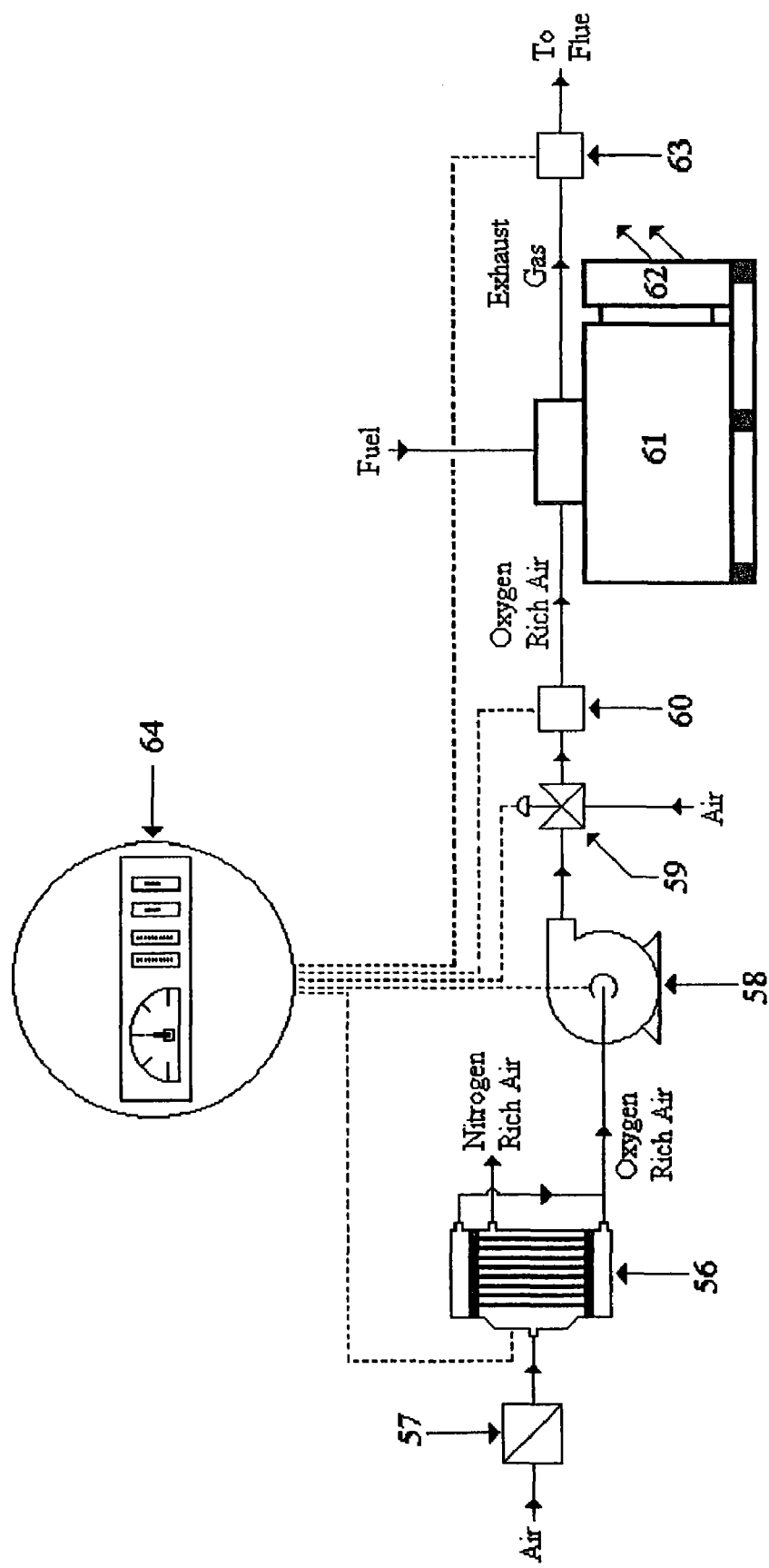
FIG. 9 illustrates how the gas separation system can be used to supply enriched oxygen air to a typical combustion process.

FIG. 9 illustrates how the gas separation system can be used to supply enriched oxygen air to a typical combustion process. FIG. 9 uses a diesel engine genset as an example of a combustion process. However, the method of oxygen enrichment illustrated in FIG. 9 would equally apply to other combustion processes, such as boilers, incinerators furnaces and kilns.

Because engines use large volumes of air to effect combustion, the system described in FIG. 9 is a typical example of how multiples of the gas separation module described in the invention would be combined together, and operated in parallel, in order to produce a large, continual supply of enriched oxygen air.

The gas separation module 56 illustrated in FIG. 9 would therefore, in practice, be a multiple combination of gas separation modules, suitably sized to produce the amount of enriched oxygen air required by the engine combustion process.

The fan inside the combined gas separation modules 56 draws normal air through a standard air filter 57 and into modules 56, where the then fan blows the air across the outsides of the gas separation membranes.

A vacuum pump or pumps 58, producing a vacuum of about 0.5 atmospheres in the evacuation chambers of the gas separation modules 56, draws the oxygen rich air fraction from the modules 56, and then feeds the oxygen rich air to a regulating valve 59. The nitrogen rich air fraction from modules 56 would normally be released to the outside atmosphere.

An oxygen sensor 60 monitors the concentration of oxygen in the combined enriched oxygen air stream coming from the gas separation modules 56 before the enriched air is fed to the combustion chambers of a compression ignition engine 61.

Fuel is introduced to the combustion chambers of the engine 61 through the engine fuel injection system fitted to the engine. The drive shaft of engine 61 is connected to a generator 62 to produce electricity.

Sensor 63 monitors the emissions in the exhaust gas coming from the engine, and particularly the level of carbon monoxide, which provides a good indication of the efficiency of the combustion process.

A control panel 64 would control the oxygen enrichment system. The fans in the gas separation modules 56, the vacuum pump or pumps 58 and the regulating valve 59, as well as other process operations, such as fuel delivery and engine power output, would all be controlled from panel 64.

The combustion process itself will be partly controlled by the management systems built into the engine and by varying the oxygen concentration in the air supplied to the engine.

The concentration of oxygen in the air supply to the engine 61 is regulated by valve 59, which can allow normal atmospheric air to mix with the enriched oxygen air coming from the gas separation module 56, until the oxygen concentration is at the required level. The regulating valve 59, and hence the oxygen concentration, is controlled in dependence of the oxygen and carbon monoxide levels measured by sensors 60 and 63 respectively.

A major benefit of enriched oxygen combustion is that some prescribed exhaust gas emissions, such as carbon monoxide, unburned hydrocarbons and particulates, will be at significantly lower levels than those produced by the engine operating under naturally aspirated conditions.

Any pollutants in the exhaust gas that are at an unacceptable environmental level, such as nitrogen oxides, can be reduced by means of well-established abatement techniques before the exhaust gas is released through the flue to the atmosphere.

Research has shown that when the combustion atmosphere of a compression ignition engine is slightly enhanced with oxygen by, for example, between 2% and 6% extra oxygen (i.e. an atmosphere of 23% oxygen, 77% nitrogen to 27% oxygen, 73% nitrogen), the efficiency of the combustion process is usually significantly improved.

Research by the applicant has shown that the degree of oxygen enrichment needed to provide efficient combustion in a compression ignition engine is very dependent on the type of fuel. For example, although standard diesel gas oil fuel is normally combusted in a naturally aspirated engine, as little as 1% extra oxygen in the combustion atmosphere in the engine, i.e. an atmosphere of 22% oxygen, 78% nitrogen, can provide a measurable improvement in combustion efficiency as well as a significant reduction in the emission of carbon monoxide.

Fuels that are normally difficult, or even impossible, to burn in a standard naturally aspirated compression ignition engine would, however, need much more oxygen in the combustion atmosphere of the engine before such fuels could be burned efficiently in the engine. For example, some very difficult-to-burn fuels may well need an additional 6% oxygen in the combustion atmosphere of the diesel engine, i.e. an atmosphere of 27% oxygen, 73% nitrogen, or possibly even more oxygen, before the engine is able to burn the fuel in a reasonably efficient manner.

This is illustrated further in Table 6, which indicates the typical enriched oxygen air content that would be required to burn various fossil and non-fossil liquid fuels in an efficient and reliable manner in a high-speed diesel engine. The approximate oxygen contents suggested in Table 6 are based on the results of practical laboratory evaluations, where various alternative fuels were combusted in a Lister-Petter test diesel engine, under different levels of oxygen enrichment, until the fuels burned efficiently.

Table 6 also gives a simple indication of the power required to produce the different enriched oxygen air compositions needed to combust the alternative fuels. The power requirements given in Table 6 are expressed as a relative value against enriched oxygen air containing 27% oxygen.

This is the enriched oxygen air concentration, i.e. 27% oxygen, 73% nitrogen, which can be produced by the membrane gas separation system described in Table 1, which has a power consumption of about 244 kWhr/tonne of added oxygen.

The enriched oxygen air concentrations that would be required to burn the different fuels given in Table 6, would then be obtained by diluting the enriched air containing 27% oxygen, as supplied by the gas separation system described in Table 1, with normal atmospheric air, until the engine air supply contains the required amount of oxygen.

TABLE 6

Combustion of Different Fuels

| Fuel | Approximate Oxygen Concentration Required | Relative Power Requirement |
| --- | --- | --- |
| Diesel gas oil | 21% | 0 |
| Diesel gas oil | 22% | 0.16 |
| Medium fuel oil | 25% | 0.67 |
| Heavy fuel oil | 27% | 1.0 |
| Recovered fuel oil | 26% | 0.83 |
| Vegetable oils | 24% | 0.5 |
| Palm oil | 23% | 0.33 |
| Animal fat | 25% | 0.67 |
| Fish oils | 25% | 0.67 |

As illustrated in Table 6, an enriched oxygen combustion atmosphere enables even a high-speed compression ignition engine to combust fossil and non-fossil fuels that would normally be either difficult or even impossible to burn in a naturally aspirated engine.

Such difficult-to-burn fuels include, medium fuel oil; heavy fuel oil; recovered fuel oil; waste mineral oils; alcohols and organic solvent blends; animal or vegetable oils and fats; and blends of fossil and non-fossil oils. Table 6 also shows that the degree of oxygen enrichment required to combust any particular difficult-to-burn fuel is dependent on the characteristics and properties of the fuel.

Difficult-to-burn fuels would normally need to be pre-conditioned, by filtration and centrifuge clarification, before being delivered to the engine, and they may also need to be heated to provide mobility. Difficult-to-burn fuels that are particularly aggressive may also require modifications to the engine fuel delivery and fuel injection systems, as well as an enriched oxygen atmosphere to combust the fuel.

The basic principles of the oxygen enrichment system described in FIG. 9 and the equipment employed in the system, i.e. the air filter, the gas separation module system, the vacuum pump, the regulating valve, the oxygen sensor and the exhaust gas sensor, would equally apply to the oxygen enrichment of other combustion processes, such as boilers, furnaces, incinerators, kilns and rotary kilns.

A supply of enriched oxygen air would not only allow the different combustion processes to combust standard fossil fuels, such as petroleum oils or coal, more efficiently and cleanly, but also enable the combustion processes to burn fuels that are of poor and variable quality in a more efficient manner.

Fuels that would particularly benefit from an enriched combustion-atmosphere include waste based fuels, such as hazardous wastes, clinical wastes and municipal solid waste, and fuel mixtures that are obtained from uncontrolled sources.

As with a compression ignition engine, the degree of oxygen enrichment required to burn either poor quality fuels or mixed fuels in boilers, furnaces, incinerators, kilns and rotary kilns would vary depending on the properties and characteristics of the fuel in question.

The gas separation system described in the invention also has significant potential for use in industrial processes where an increase in the concentration of oxygen in the air supplied to the process, compared to operation under normal atmospheric conditions, would provide benefits and efficiencies. Such processes include chemical production, aerobic fermentation, water treatment, water purification and fish farming.

Further applications also still exist for enriched oxygen air in industries, such as the metals, glass, paper and petrochemicals industries, where the use of pure oxygen for large processes is already well established. In particular, a cost effective supply of enriched oxygen air could be used for smaller processes that do not have the economy of scale to justify the on-site manufacture of pure oxygen.

Being able to combine together large multiples of gas separation modules allows the gas separation system to be designed so as to suit specific industrial and combustion end-use applications. Multiple combinations even allow the gas separation system to be used for processes that need extremely large amounts of enriched oxygen air. Previously, end-use applications that required very high volumes of enriched oxygen air were limited to using expensive pure oxygen manufactured by an onsite production process.

From yet a further aspect therefore, the low-pressure, lightweight gas separation modules containing the hollow fibre membranes described in the invention are capable of being combined together in multiples, and then operated in parallel, so as to provide a gas separation system that is able to supply very high volumes of enriched oxygen air to industrial and combustion processes which have very high demands for enhanced air.

The vacuum required by multiple combinations of gas separation modules would be supplied by either a single common vacuum pump or a number of separate vacuum pumps.

The production of enriched oxygen air from normal atmospheric air is probably the most significant commercial application for the hollow fibre gas separation membranes described in the invention. However, there could well be potential applications for the gas separation system that would involve gas mixtures other than oxygen and nitrogen. For example, there will probably be potential applications where the gas separation system described in the invention could be adapted so as to be able to enrich or separate gases or vapours in mixed gas streams produced by industrial processes.

The effectiveness of the gas separation system for other gas mixtures will be dependent on a number of factors including: the relative selectivity of the hollow fibre membranes to different gases in a particular gas mixture; the relative concentrations of the different gases in the gas mixture; the temperature, pressure, volume and flow rate of the gas mixture produced by the industrial process; the degree of enrichment required for any particular individual gas in the gas mixture.

The composite hollow fibre membrane described above uses an extruded polyethersulfone fibre tube, which is subjected to a modification technique before the fibre tube is finally coated with polydimethylsiloxane selective polymer. As well as polyethersulfone, other polymers are also used to produce hollow fibre tubes that are capable of supporting a coating of polydimethylsiloxane polymer, including, for example, polyamideimide and cellulose acetate materials.

It may well be that the fibre modification technique, or an adaptation of the technique, could be applied to fibre tubes manufactured from these alternative polymer materials before the tubes are eventually coated with polydimethylsiloxane.

The invention claimed is:

1. A method of producing composite, hollow fibre gas separation membranes, wherein external surfaces of the porous hollow fibre tubes used in the construction of the membranes are subjected to a modification technique comprising soaking the porous hollow fibre tubes in a solvent solution before the external surfaces are coated with a thin layer of selective polymer so as to increase the number of pores in the fibre surface, wherein the structure of the porous fibre tube is modified by soaking the tube in the solvent solution until the solution has penetrated into the exposed open pores on the outside of the tube, and wherein the solvent solution is displaced by distilled water and the fibre tube is then dried.

2. A method as claimed in claim 1, wherein the fibre tube is manufactured from polyethersulfone polymer.

3. A method as claimed in claim 1, wherein the structure of the porous fibre tube is modified by soaking the tube, under controlled temperature and differential pressure conditions.

4. A method as claimed in claim 3, wherein the solvent solution consists of a mixture of acetone and distilled water.

5. A method as claimed in claim 4, wherein the composition of the solvent solution is between about 10% to 90% acetone and between about 10% to 90% by weight distilled water.

6. A method as claimed in claim 3, wherein the fibre tube is soaked in the solvent solution for about 200 sec, the process temperature is about 50° C., and the pressure differential across the tube about 0.9 atmospheres.

7. A method as claimed in claim 1, wherein the modification process is carried out on pre-cut lengths of fibre tube located inside a pressure vessel, and wherein each end of each pre-cut fibre tube is fixed in polyurethane polling compound so that the hollow inner cores of the tubes are exposed and open out into a manifold situated at each end of the pressure vessel.

8. A method as claimed in claim 7, wherein a pressure differential is applied inside the pressure vessel between the outside walls and the inner cores of the fibre tubas.

9. A method as claimed in claim 1, wherein the modification process is carried out on long lengths of fibre tube wound onto a rectangular frame.

10. A method as claimed in claim 2, wherein the application of the modification technique to the polyethersulfone fibre tube results in the modified fibre tube having up to twice as many pores in its structure as unmodified fibre and a gas permeability up to twice that of unmodified fibre.

11. A method as claimed in claim 1, wherein the modification technique improves the surface characteristics of the fibre tube so that the outer surface of the tube is able to support a very thin, defect free layer of selective polymer material.

12. A method as claimed in claim 1, wherein a selective polymer material is coated onto the modified surface of the fibre tube.

13. A method as claimed in claim 1, wherein the modified fibre tubes are immersed in a second solvent solution of a selective polymer inside a pressure vessel and on extraction of the second solvent from the second solvent solution a very thin coating of selective polymer is left on the outside surface of the tube.

14. A method as claimed in claim 13, wherein the pressure vessel used to coat the modified fibre tubes is the same pressure vessel that was originally used to modify the fibre tubes.

15. A method as claimed in claim 12, wherein the selective polymer consists of a mixture of non-cross linked polydimethylsiloxane and cross-linked polydimethylsiloxane.

16. A method as claimed in claim 13, wherein the second solvent is petroleum ether, a liquid hydrocarbon or a chlorohydrocarbon.

17. A method as claimed in claim 15, wherein the coating of polydimethylsiloxane deposited onto the fibre tube is between about 0.1 to 1 micron thick.

18. A method as claimed in claim 1, wherein the outside coated surface of the modified composite hollow fibre membrane is plasma treated to further improve the gas selectivity properties of the membrane.

19. A method of manufacturing a gas separation module wherein a composite, hollow fibre gas separation membrane, wherein external surfaces of the porous hollow fibre tubes used in the construction of the membrane are subjected to a modification technique comprising soaking the porous hollow fibre tubes in a solvent solution before said external surfaces are coated with a thin layer of selective polymer so as to increase the number of pores in the fibre surface, said method comprising:
  packing a plurality of said composite hollow fibre gas separation membranes into a polyurethane polling compound inside said gas separation module so that the inner cores of the membranes are exposed and open out into an evacuation chamber situated at each end of the gas separation module, in a manner whereby a differential pressure can be applied between the outside walls and the inner cores of the membranes;
  soaking the plurality of said composite hollow fibre gas separation membranes in the solvent solution until the solution has penetrated into the exposed open pores on the outside of the membranes;
  displacing the solvent solution by distilled water; and then drying the membranes.

20. A method of operating a gas separation module, said gas separation module being formed by a composite, hollow fibre gas separation membrane, wherein external surfaces of the porous hollow fibre tubes used in the construction of the membrane are subjected to a modification technique comprising soaking the porous hollow fibre tubes in a solvent solution before said external surfaces are coated with a thin layer of selective polymer so as to increase the number of pores in the fibre surface, said method comprising packing a plurality of said composite hollow fibre gas separation membranes into a polyurethane polling compound inside said gas separation module so that the inner cores of the membranes are exposed and open out into an evacuation chamber situated at each end of the gas separation module in a manner whereby a differential pressure can be applied between the outside walls and the inner cores of the membranes; wherein said method comprising:
  applying a positive pressure to the outside of said hollow fibre membranes, thereby forming said differential pressure between the outside walls and the inner cores of the hollow fibre membranes;
  soaking said hollow fibre membranes in the solvent solution until the solution has penetrated into the exposed open pores on the outside walls of the hollow fibre membranes;
  displacing the solvent solution by distilled water; and then drying the hollow fibre membranes.

21. A method of operating a gas separation module, said gas separation module being formed by a composite, hollow fibre gas separation membrane, wherein external surfaces of the porous hollow fibre tubes used in the construction of the membrane are subjected to a modification technique comprising soaking the porous hollow fibre tubes in a solvent solution before said external surfaces are coated with a thin layer of selective polymer so as to increase the number of pores in the fibre surface, said method comprising packing a plurality of said composite hollow fibre gas separation membranes into a polyurethane potting compound inside said gas separation module so that the inner cores of the membranes are exposed and open out into an evacuation chamber situated at each end of the gas separation module, in a manner whereby a differential pressure can be applied between the outside walls and the inner cores of the membranes, said method comprising:
  applying a vacuum to the inner core of said membranes such that said differential pressure is formed between the outside walls and the inner cores of the hollow fibre membranes;
  soaking said hollow fibre membranes in the solvent solution until the solution has penetrated into the exposed open pores on the outside walls of the hollow fibre membranes;
  displacing the solvent solution by distilled water; and then drying the hollow fibre membranes.

22. A method as claimed in claim 21, wherein the vacuum is applied equally to each evacuation chamber in the gas separation module, so that the vacuum is then applied equally to each open end of the inner cores of the hollow fibre membranes.

23. A method as claimed in claim 22, wherein the vacuum applied to the inner cores of membranes is between about 0.3 to 0.8 atmospheres.

24. A method as claimed in claim 21, wherein the application of a vacuum to the inner cores of the modified hollow fibre membranes produces oxygen rich air containing up to 27% oxygen, and under certain conditions oxygen rich air containing up to 35% oxygen.

25. A method as claimed in claim 19, wherein the gas separation module is manufactured from relatively lightweight, albeit pressure resistant, materials.

26. A method as claimed in claim 21, wherein a plurality of gas separation modules are combined together in multiples and operated in parallel using either a common vacuum pump or a number of vacuum pumps to apply the vacuum to the inner cores of the membranes inside the gas separation modules.

27. A method as claimed in claim 26 wherein a multiple module gas separation system produces up to 150 m$^3$/min, or more, of enriched oxygen air containing 27% oxygen, 73% nitrogen, by the application of a vacuum of about 0.5 atmospheres to the inner cores of the membranes inside the modules, and wherein the energy consumption required to produce the enriched oxygen air is equivalent to about 240 kWhr/tonne of added oxygen.

28. A method as claimed in claim 21, wherein the outside coated surface of the modified composite hollow fibre membrane is plasma treated to further improve the gas selectivity properties of the membrane, and wherein the application of a vacuum to the inner corns of plasma treated hollow fibre membranes produces oxygen rich air containing up to 50% oxygen.

29. A method as claimed in claim 28 wherein a combined multiple module gas separation system containing plasma treated hollow fibre membranes produces up to 100m$^3$/min, or more, of enriched oxygen air containing 32% oxygen, 68% nitrogen, by the application of a vacuum of about 0.5 atmospheres to the inner cores of the membranes inside the modules, and wherein the energy consumption required to produce the enriched oxygen air is equivalent to about 175 kWhr/tonne of added oxygen.

30. A method of enriching or separating gas mixtures other than oxygen and nitrogen, comprising utilizing the composite hollow fibre gas separation membrane produced by the method of claim 1.

31. A gas separation system consisting of a gas separation module containing composite hollow fibre membranes wherein external surfaces of the porous hollow fibre tubes used in the construction of the membrane are subjected to a modification technique comprising soaking the porous hollow fibre tubes in a solvent solution before said external surfaces are coated with a thin layer of selective polymer so as to increase the number of pores in the fibre surface, said composite hollow fibre gas membranes being packed into a polyurethane potting compound inside said gas separation module so that the inner cores of the membranes are exposed and open out into an evacuation chamber situated at each end of the gas separation module, in a manner whereby a differential pressure can be applied between the outside walls and the inner cores of the membranes, said gas separation system comprising:
  a low energy fan inside the gas separation module to draw in and then blow normal atmospheric air across the outsides of the membranes,
  two evacuation chambers inside the gas separation module so that a vacuum can be equally applied to each end of the hollow cores inside the membranes,
  a vacuum pump to supply the required vacuum to the gas separation module,
  an oxygen sensor to measure the oxygen concentration in the enriched oxygen air produced by the gas separation module, and
  a regulating valve to adjust the concentration of oxygen in the enriched oxygen air, when necessary, by admitting normal atmospheric air into the oxygen rich air.

32. A gas separation system for supplying enriched oxygen air to enclosed spaces or environments, consisting of a gas separation module containing composite hollow fibre membranes wherein external surfaces of the porous hollow fibre tubes used in the construction of the membrane are subjected to a modification technique comprising soaking the porous hollow fibre tubes in a solvent solution before said external surfaces are coated with a thin layer of selective polymer so as to increase the number of pores in the fibre surface, said composite hollow fibre gas membranes being packed into a polyurethane potting compound inside said gas separation module so that the inner cores of the membranes are exposed and open out into an evacuation chamber situated at each end of the gas separation module, in a manner whereby a differential pressure can be applied between the outside walls and the inner cores of the membranes, said gas separation system comprising:
  a low energy fan inside the gas separation module to draw in and then blow normal atmospheric air across the outsides of the membranes,
  a vacuum pump to supply the required vacuum to the gas separation module,
  an oxygen sensor to measure the oxygen concentration in the enriched oxygen air produced by the gas separation module,
  a regulating valve to adjust the concentration of oxygen in the enriched oxygen air, when necessary, by admitting normal air into the enriched oxygen air, and
  a control system to control and regulate the gas separation module, the vacuum pump, the amount of enriched oxygen air supplied to the enclosed space, and the concentration of oxygen in the enriched oxygen air supplied to the enclosed space.

33. A gas separation system for supplying enriched oxygen air to combustion and industrial processes that require very large volumes of enriched oxygen air, consisting of multiples of gas separation modules connected together in parallel, the modules containing composite hollow fibre membranes wherein external surfaces of the porous hollow fibre tubes used in the construction of the membrane are subjected to a modification technique comprising soaking the porous hollow fibre tubes in a solvent solution before said external surfaces are coated with a thin layer of selective polymer so as to increase the number of pores in the fibre surface, said composite hollow fibre gas membranes being packed into a polyurethane potting compound inside said gas separation module so that the inner cores of the membranes are exposed and open out into an evacuation chamber situated at each end of the gas separation module, in a manner whereby a differential pressure can be applied between the outside walls and the inner cores of the membranes, said gas separation system comprising:
  a low energy fan inside each gas separation module to draw in and then blow normal air across the outsides of the membranes,
  a vacuum pump or vacuum pumps to supply the required vacuum to the gas separation modules,
  an oxygen sensor to measure the oxygen concentration in the combined enriched oxygen air stream produced by the gas separation modules,
  a regulating valve to adjust the concentration of oxygen in the combined enriched oxygen air stream, when necessary, by admitting normal air into the enriched oxygen air, a gas sensor in the exhaust gas coming from the process to monitor pollutants, such as carbon monoxide, emitted from the process, and
  a control system to control and regulate the gas separation modules, the vacuum pump or pumps, the amount of enriched oxygen air supplied to the process and the concentration of oxygen in the enriched oxygen air supplied to the process.

34. A method of treating the external surface of a hollow fibre gas separation tube prior to application of a selective polymer layer to the external surface of the tube, comprising soaking the surface in a structure modifying solvent which penetrates into pores in the surface, displacing the solvent with water and then drying the fibre tube.

35. A method as claimed in claim 34 wherein the tube is manufactured from polyethersulfone polymer.

36. A method as claimed in claim 34 wherein the solvent comprises acetone.

37. A method of producing composite, hollow fibre gas separation membranes, wherein external surfaces of the porous hollow fibre tubes used in the construction of the membranes are subjected to a modification technique that increases the number of pores in the external surfaces of the fibre tubes and improves the surface characteristics of the fibre tubes before the external surfaces are coated with a layer of selective polymer, wherein the structure of the porous fibre tube is modified by soaking the tube in the solvent solution until the solution has penetrated into the exposed open pores on the outside of the tube, and wherein the solvent solution is displaced by distilled water and the fibre tube is then dried.

38. A method according to claim 3, wherein said fibre tube is dried by the application of a vacuum or pressure differential to said fibre tube.

39. The method according to claim 5, wherein said solvent solution has a composition of 50% acetone and 50% water by weight.

40. A method as claimed in claim 23, wherein the vacuum applied to the inner cores of membranes is between about 0.4 to 0.6 atmospheres.

41. A method as claimed in claim 25, wherein the relatively lightweight, albeit pressure resistant, materials comprise a material selected from the group consisting of lightweight metals, rigid plastics, and combinations of such materials.

42. A gas separation system as in claim 32, wherein the enclosed spaces or environments comprise hospital wards or high altitude dormitories.

* * * * *